…

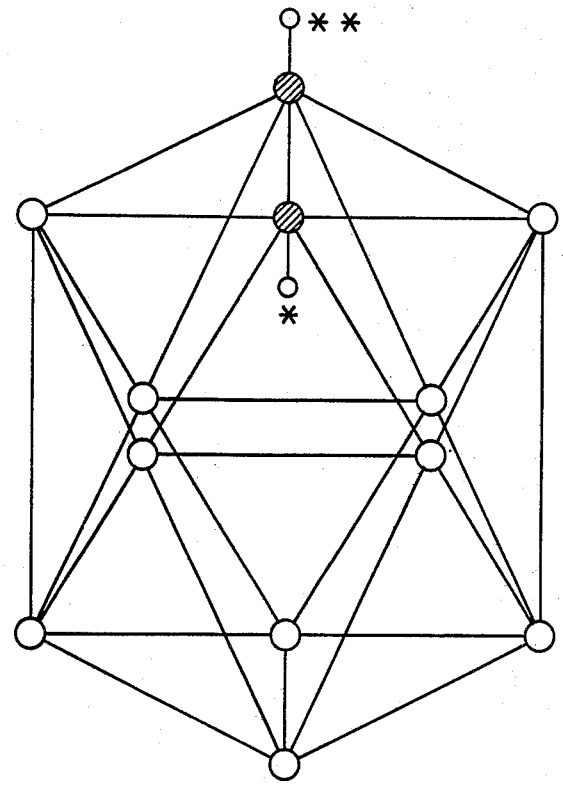
○ Boron
▨ Carbon
○ Hydrogen on Carbon
(Hydrogen atoms on boron omitted for clarity)

United States Patent Office 3,109,858
Patented Nov. 5, 1963

3,109,858
UNSYMMETRICAL ORGANOBORON DICARBOXYLIC ACIDS AND PROCESS FOR THEIR SYNTHESIS
John W. Ager, Jr., Buffalo, Roy P. Alexander, Lewistown, and Theodore L. Heying, Tonawanda, N.Y., assignors to Olin Mathieson Chemical Corporation
Filed Nov. 6, 1959, Ser. No. 851,472
11 Claims. (Cl. 260—537)

This invention relates to unsymmetrical organoboron dicarboxylic acids and to a method for their preparation. This invention is particularly concerned with the preparation of unsymmetrical organoboron dicarboxylic acids of the class $$RR'B_{10}H_8[C(CH_2COOH)C(COOH)]$$

wherein R and R' are each hydrogen or an alkyl radical containing 1 to 5 carbon atoms.

Application Serial No. 809,569, filed April 28, 1959, of John W. Ager, Jr. et al. describes a method for the preparation of organoboron dicarboxylic acids of the class $RR'B_{10}H_8[C(COOH)C(COOH)]$ wherein R and R' have their previous significance. For example, the organoboron dicarboxylic acid $$B_{10}H_{10}[C(COOH)C(COOH)]$$

can be prepared by reacting $B_{10}H_{10}(CHCH)$, obtained by reacting for about 12 hours at 125° C. a mixture of decaborane and tetrahydrofuran in an autoclave pressured to 100 p.s.i. with acetylene, successively with butyl lithium, carbon dioxide, and an aqueous solution of hydrochloric acid. The reaction depends upon the presence of at least one hydrogen attached to a boron linked carbon atom.

Application Serial No. 812,066, filed May 8, 1959, of John W. Ager, Jr. et al. describes a method for the preparation of organoboron dicarboxylic acids of the class $$RR'B_{10}H_8[C(CH_2COOH)C(CH_2COOH)]$$

wherein R and R' have their previous significance. For example, the organoboron dicarboxylic acid $$B_{10}H_{10}[C(CH_2COOH)C(CH_2COOH)]$$

can be prepared by oxidizing with a sulfuric acid-chromic acid mixture the organoboron alcohol $$B_{10}H_{10}[C(CH_2CH_2OH)C(CH_2CH_2OH)]$$

The reaction depends upon the presence of at least one hydroxy-alkyl radical containing at least 2 carbon atoms attached to a boron linked carbon atom.

According to the present invention, unsymmetrical organoboron dicarboxylic acids of the class $$RR'B_{10}H_8[C(R'')C(R''')]$$

where R and R' are each hydrogen or an alkyl radical containing 1 to 5 carbon atoms and wherein one of R'' and R''' is a carboxyl group and one of R'' and R''' is a carboxyalkyl group containing 2 to 8 carbon atoms, can be prepared by reacting successively with an alkali metal alkyl or aryl, carbon dioxide and an aqueous solution of a mineral acid a compound of the class $$RR'B_{10}H_8(CR''CR''')$$

wherein R and R' are each hydrogen or an alkyl radical containing 1 to 5 carbon atoms and wherein one of R'' and R''' is a hydrogen and one of R'' and R''' is a radical of the class $$R_1O\overset{O}{\underset{\|}{C}}R_2$$

wherein $R_1$ is a bivalent saturated hydrocarbon radical containing 2 to 8 carbon atoms and $R_2$ is a benzyl radical or an alkyl radical containing 1 to 6 carbon atoms, separating aqueous and organic phases of the resulting mixture, hydrolyzing the organic phase by reaction with a lower alkanol solution of an alkali metal hydroxide to form as an intermediate $RR'B_{10}H_8(CR''CR''')$ wherein R and R' have their previous significance, and wherein one of R'' and R''' is a carboxyl group and one of R'' and R''' is a hydroxyalkyl group containing 2 to 8 carbon atoms, and oxidizing the intermediate with an oxidizing agent capable of oxidizing a hydroxyl group to a carboxyl group.

The preferred alkali metal alkyls are the lithium alkyls such as methyl lithium, ethyl lithium, isopropyl lithium, n-propyl lithium, n-butyl lithium, sec-butyl lithium, t-butyl lithium, n-amyl lithium, and the like, since they are soluble in inert organic solvents. Other alkali metal alkyls, such as the sodium and potassium alkyls, however, can also be employed as can the alkali metal aryls including phenyl lithium.

The ratio of alkali metal alkyl to organoboron ester can vary widely, generally being within the range of from 0.1 to 10 moles of alkali metal alkyl per mole of organoboron ester and preferably in the range of from 1 to 3 moles of alkali metal alkyl per mole of organoboron ester. The temperature of the reaction of the organoboron ester with the alkali metal alkyl is generally maintained between −90° C. and 50° C. and preferably at or below room temperature. The pressure employed can vary widely, although atmospheric pressure reactions are convenient. The reaction of the alkali metal alkyl with the organoboron compound is substantially instantaneous so that slow addition of the alkali metal alkyl to the reaction mixture is practised to prevent overheating. Advantageously the reaction is conducted while the reactants are dissolved in an inert organic solvent such as ether solvents including lower dialkyl ethers, tetrahydrofuran, dioxane, ethylene and polyethylene glycol dialkyl ethers, and hydrocarbon solvents including n-pentane, hexane, and heptane, aromatic hydrocarbon solvents such as benzene, toluene, and xylene, and cyclo-aliphatic solvents such as cyclohexane and methylcyclohexane. The amount of solvent can vary widely but generally ranges up to about 50 times the weight of the reactants.

The amount of carbon dioxide employed can also be varied widely, and a large molar excess, such as a tenfold excess or higher, is preferably employed to favor complete carbonation of the organoboron compound. The carbonation reaction in a sealed system at greater than atmospheric pressure is conveniently conducted at room temperature, while atmospheric pressure carbonation is usually cooled to remove the heat of reaction. The pressure employed can vary widely, generally being in the range of from 0.1 to 30 atmospheres, although the reaction proceeds well at atmospheric pressure. The carbonation reaction generally proceeds in about 10 hours to 20 days in a sealed system at atmospheric pressure.

The carbonation reaction mixture is treated with an aqueous solution of a mineral acid such as hydrochloric acid, sulfuric acid, nitric acid, and the like. The resulting reaction mixture contains in the organic layer an organoboron compound having a free carboxyl group and an ester group.

The organic layer is separated and the ester group is hydrolyzed by reaction with a lower alkanol solution of an alkali metal hydroxide to form the organoboron hydroxy carboxylic acid.

Lower alkanols which can be used are methanol, ethanol, n-propanol, isopropanol, n-butanol, isobutanol, and tertiary butanol, the reactants not being as soluble in the higher alkanols.

Potassium hydroxide is preferred as the alkali metal hydroxide because it is more soluble in the lower alkanol but other alkali metal hydroxides such as sodium and lithium hydroxides can be used.

In the complete absence of water, the ester is hydrolyzed but the alkali metal alcoholate is produced instead of the alcohol. Hence the alkanol solution advantageously contains a small amount of water. The amount of water present should not, however, be so great as to reduce appreciably the solubility of the organoboron ester in the alkali metal hydroxide solution. Separation of the product is then accomplished by acidification of the solution or precipitation of the product from the solution, followed by removal of the product.

The ratio of reactants in the hydrolysis of the organoboron esters can be varied widely, generally being in the range of from 0.01 to 10 moles of alkali metal hydroxide per equivalent of ester (i.e. per mole of carboxylic acid liberated by the hydrolysis) and preferably in the range of from 1 to 6 moles of alkali metal hydroxide per equivalent of ester. Sufficient alcohol can be present to produce a solution containing 1 percent alkali metal hydroxide to a saturated solution of alkali metal hydroxide. The reaction temperature can vary widely, generally being from 0 to 150° C. and preferably between 20 and 80° C. The reaction pressure can vary from subtatmospheric to several atmospheres, i.e., from 0.2 to 20 atmospheres, although atmospheric pressure reactions are convenient. The degree of completeness of the reaction can be determined by analysis of the reaction mixture. The reaction generally requires from one tenth to ten hours and preferably from one half to three hours, depending upon the ratio of reactants, the particular reactants and solvents employed and the temperature and pressure of the reaction.

Conventional oxidizing agents for oxidizing the organoboron hydroxy carboxylic acids include sulfuric-chromic acid admixtures, alkaline permanganate solutions such as potassium permanganate dissolved in aqueous potassium hydroxide, acetic acid solutions of chromic anhydride, the alkali metal dichromates in the presence of sulfuric acid, hydrogen peroxide, dilute aqueous chloric acid, dilute aqueous nitric acid, and the like. The oxidizing agent is preferably employed in slight excess and the reaction is carried out at relatively low temperatures of about 0° to 50° C., depending upon the oxidizing agent employed, with stirring.

To facilitate reaction, the organoboron hydroxy carboxylic acid is preferably dissolved in a suitable solvent such as acetone, water, dioxane or acetic acid maintained cold.

The preferred oxidizing agent is a sulfuric-chromic acid admixture and, where this is used, water preferably is added after the oxidation reaction to reduce the solubility of the unsymmetrical organoboro acid in the mineral acid mixture and to permit extraction with a suitable solvent, such as diethyl ether. The unsymmetrical organoboron acid product can be conveniently separated from any unreacted starting material by crystallization from a suitable organic solvent such as heptane, toluene, heptane-toluene mixture or alcohol-water mixture.

The solid products prepared in accordance with the method of this invention, when incorporated with suitable oxidizers such as ammonium perchlorate, potassium perchlorate, sodium perchlorate, ammonium nitrate and the like, yield solid propellants suitable for rocket power plants and other jet propelled devices. Such propellants burn with high flame speeds, have high heats of combustion and are of the high specific impulse type. The solid products of this invention when incorporated with oxidizers are capable of being formed into a wide variety of grains, tablets and shapes, all with desirable mechanical and chemical properties. Propellants produced by the methods described in this application burn uniformly without disintegration when ignited by conventional means, such as a pyrotechnic type igniter, and are mechanically strong enough to withstand ordinary handling.

The process of the invention is illustrated in detail by the following example.

*Example*

23.0 g. (0.1 mole) of

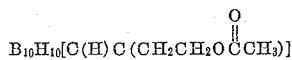

is dissolved in approximately 250 ml. of diethyl ether and an equimolar quantity of n-butyl lithium in n-heptane (2.27 molar solution) is added slowly at room temperature. The resulting solution is cooled to 0 to 10° C. and a slow stream of carbon dioxide is bubbled through. After two hours, the mixture is poured into cold, dilute hydrochloric acid. The mixture is shaken in a separatory funnel and the organic layer is washed with several portions of water. The organic layer is then dried over anhydrous magnesium sulfate and filtered. The solvents are removed under reduced pressure. An oil is obtained which is not further purified, but which is dissolved in 200 ml. of saturated ethanolic potassium hydroxide with cooling sufficient to maintain the temperature at or below 30° C. The solution is stirred for 3 hours at room temperature and poured into a large volume of dilute hydrochloric acid. The resulting solid precipiate of

is removed by filtration and air dried (17 g. or about 80 percent yield of crude product).

The hydroxy acid is dissolved in approximately 150 ml. of acetone and cooled to 0 to 10° C. as an equivalent amount of 2 N chromic acid in 12 N sulfuric acid is slowly added. Stirring is continued for an additional 3 hours as the solution warms to room temperature. The mixture is poured into 3 times its volume of water and the dicarboxylic acid precipitates and is removed by filtration. Recrystallization from alcohol-water gives 17.4 g. (overall yield 70 percent) of

The boron-containing solid materials produced by practicing the method of this invention can be employed as ingredients of solid propellant compositions in accordance with general procedures which are well understood in the art, inasmuch as the solids produced by practicing the present process are readily oxidized using conventional solid oxidizers such as ammonium perchlorate, potassium perchlorate, sodium perchlorate, ammonium nitrate and the like. In formulating a solid propellant composition employing one of the materials produced in accordance with the present invention, generally from 10 to 35 parts by weight of boron-containing material and 65 to 90 parts by weight of the oxidizer are used. In the propellant, the oxidizer and the product of the present process are formulated in admixture with each other by finely subdividing each of the materials and thereafter intimately mixing them. The purpose of doing this, as the art is well aware, is to provide proper burning characteristics in the final propellant. In addition to the oxidizer and the oxidizable material, the final propellant can also contain an artificial resin, generally of the urea-formaldehyde or phenol-formaldehyde type. The function of the resin is to give the propellant mechanical strength and at the same time improve its burning characteristics. Thus, in the manufacture of a suitable propellant, proper proportions of finely divided oxidizer and finely divided boron-containing material can be admixed with a high solids content solution of partially condensed urea-formaldehyde or phenol-formaldehyde resin, the proportions being such that the amount of resin is about 5 to 10 percent by weight based upon the weight of oxidizer and the boron compound. The ingredients can be thoroughly mixed with simultaneous removal of solvent, and following this the solvent free mixture can be molded into the desired shape as by extrusion. Thereafter, the resin can be cured by resorting to heating at moderate temperatures. For further information concerning the formulation of solid propellant compositions reference is made to U.S. Patent 2,622,277 to Bonnell and to U.S. Patent 2,646,596 to Thomas.

The compound $B_{10}H_{10}[C(COOH)C(CH_2COOH)]$ of the example has the same structural formula as shown in the accompanying drawing except that the hydrogen atom indicated by the single asterisk is replaced by the radical —COOH and the hydrogen atom indicated by the double asterisk is replaced by the radical —$CH_2COOH$.

We claim:
1. A process for the preparation of unsymmetrical organoboron dicarboxylic acids which comprises reacting successively with a material selected from the class consisting of alkali metal lower alkyls and alkali metal phenyls, carbon dioxide and an aqueous solution of a mineral acid, an organoboron compound of the class

$$RR'B_{10}H_8(CR''CR''')$$

wherein R and R' are selected from the class consisting of hydrogen and an alkyl radical containing 1 to 5 carbon atoms and wherein one of R'' and R''' is hydrogen and one of R'' and R''' is a radical of the class

wherein $R_1$ is a bivalent saturated hydrocarbon radical containing 2 to 8 carbon atoms and $R_2$ is selected from the class consisting of a benzyl radical and alkyl radicals containing 1 to 6 carbon atoms, the molar ratio of said material to said organoboron compound being within the range 0.1 to 10:1, separating aqueous and organic phases of the resulting mixture, hydrolyzing the organic phase by reaction with sufficient lower alkanol solution of an alkali metal hydroxide to provide 0.01 to 10 moles of alkali metal hydroxide per mole of said organoboron compound to form as an intermediate a compound of the class $RR'B_{10}H_8(CR^*CR^{**})$ wherein R and R' have their previous significance and wherein one of $R^*$ and $R^{**}$ is a carboxyl group and one of $R^*$ and $R^{**}$ is a hydroxyalkyl group containing 2 to 8 carbon atoms, and oxidizing the intermediate with an oxidizing agent capable of oxidizing a hydroxyl group to a carboxyl group selected from the class consisting of sulfuric-chromic acid admixtures, alkaline permanganate solutions, acetic acid solutions of chromic anhydride, an alkali metal dichromate in the presence of sulfuric acid, hydrogen peroxide, dilute aqueous chloric acid, and dilute aqueous nitric acid.

2. The method of claim 1 wherein the said material is an alkali metal lower alkyl.

3. The method of claim 2 wherein the said alkali metal alkyl is n-butyl lithium.

4. The method of claim 1 wherein the organoboron compound is

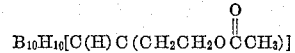

5. The method of claim 1 wherein the mineral acid is hydrochloric acid.

6. The method of claim 1 wherein the lower alkanol is ethanol.

7. The method of claim 1, wherein the alkali metal hydroxide is potassium hydroxide.

8. The method of claim 1 wherein the oxidizing agent is a sulfuric acid-chromic acid mixture.

9. The method of claim 2 wherein the said alkali metal alkyl is n-butyl lithium, wherein the organoboron compound is

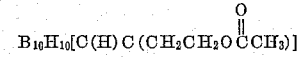

wherein the mineral acid is hydrochloric acid, wherein the lower alkanol is ethanol, wherein the alkali metal hydroxide is potassium hydroxide, and wherein the oxidizing agent is a sulfuric acid-chromic acid mixture.

10. $RR'B_{10}H_8(CR''CR''')$ wherein R and R' are each selected from the class consisting of hydrogen and an alkyl radical containing 1 to 5 carbon atoms and wherein one of R'' and R''' is a carboxyl group and one of R'' and R''' is a carboxyalkyl group containing 2 to 8 carbon atoms.

11. $B_{10}H_{10}[C(COOH)C(CH_2COOH)]$.

No references cited.